United States Patent
Stoelzle et al.

(10) Patent No.: US 11,049,394 B2
(45) Date of Patent: Jun. 29, 2021

(54) METHOD FOR COMMUNICATING WITH A ROAD USER

(71) Applicant: Robert Bosch GmbH, Stuttgart (DE)

(72) Inventors: Marco Stoelzle, Stuttgart (DE); Kevin Bareiss, Mutlangen (DE); Stefan Nordbruch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/915,103

(22) Filed: Jun. 29, 2020

(65) Prior Publication Data

US 2021/0012657 A1  Jan. 14, 2021

(30) Foreign Application Priority Data

Jul. 8, 2019  (DE) .......................... 102019209988.2

(51) Int. Cl.
  *G08G 1/09* (2006.01)
  *H04W 4/40* (2018.01)
  *G08G 1/005* (2006.01)

(52) U.S. Cl.
  CPC ................ *G08G 1/09* (2013.01); *H04W 4/40* (2018.02); *G08G 1/005* (2013.01)

(58) Field of Classification Search
  None
  See application file for complete search history.

(56) References Cited

U.S. PATENT DOCUMENTS

| 9,881,503 | B1* | 1/2018 | Goldman-Shenhar ...................... G05D 1/0088 |
| 10,446,149 | B2* | 10/2019 | Mattingly ............... G10L 15/22 |
| 2018/0326982 | A1* | 11/2018 | Paris ................. B60W 50/0097 |
| 2019/0027028 | A1* | 1/2019 | Fields .................... G08G 1/162 |
| 2020/0223352 | A1* | 7/2020 | Toshio Kimura .... G05D 1/0088 |

FOREIGN PATENT DOCUMENTS

| DE | 102014226188 A1 | 6/2016 |
| DE | 202016002778 U1 | 7/2016 |
| DE | 102015210781 A1 | 12/2016 |
| DE | 102016125005 A1 | 6/2018 |
| DE | 102017200727 A1 | 7/2018 |

\* cited by examiner

*Primary Examiner* — Brent Swarthout
(74) *Attorney, Agent, or Firm* — Norton Rose Fulbright US LLP; Gerard Messina (57) ABSTRACT

A method for communicating with a road user located in the surroundings of a motor vehicle driven in at least a semi-automated manner. The method includes: receiving surroundings signals; processing the surroundings signals to detect a road user; upon detection of a road user, ascertaining whether a need to communicate with the road user exists; if a need to communicate with the road user exists, ascertaining at least which communication device of a communication device of the motor vehicle, on the motor vehicle side, and of a communication device of an infrastructure, on the infrastructure side, in which the motor vehicle and the road user are located, is to be used in order to communicate with the road user; generating control signals for controlling the communication device(s) to control the communication device(s) to communicate with the road user based on the control signals; and outputting the generated control signals.

10 Claims, 6 Drawing Sheets

METHOD FOR COMMUNICATING WITH A ROAD USER

CROSS REFERENCE

The present application claims the benefit under 35 U.S.C. § 119 of German Patent Application No. DE 102019209988.2 filed on Jul. 8, 2019, which is expressly incorporated herein by reference in its entirety.

FIELD

The present invention relates to a method for communicating with a road user located in the surroundings of a motor vehicle driven in at least a semi-automated manner. The present invention further relates to a device, to a computer program and to a machine-readable memory medium.

BACKGROUND INFORMATION

German Patent Application No. DE 10 2014 226 188 A1 describes a communication between a vehicle and a road user in the surroundings of the vehicle.

German Patent Application No. DE 10 2016 125 005 A1 describes a device and a method for a vehicle for providing a bi-directional communication between the vehicle and a passerby.

SUMMARY

An object of the present invention is to provide for efficiently communicating with a road user located in the surroundings of a motor vehicle driven in at least a semi-automated manner.

This object may be achieved in accordance with an example embodiment of the present invention. Advantageous embodiments of the present invention are described herein.

According to a first aspect of the present invention, an example method is provided for communicating with a road user located in the surroundings of a motor vehicle driven in at least a semi-automated manner, the method including the following steps:
- receiving surroundings signals, which represent the surroundings of a motor vehicle driven in at least a semi-automated manner,
- processing the surroundings signals in order to detect a road user in the surroundings of the motor vehicle,
- upon detection of a road user, ascertaining whether a need to communicate with the road user exists due to the presence of the motor vehicle,
- if a need to communicate with the road user exists, ascertaining at least which communication device of a communication device of the motor vehicle on the motor vehicle side and of a communication device of an infrastructure on the infrastructure side in which the motor vehicle and the road user are located, is to be used in order to communicate with the road user,
- generating control signals for controlling the ascertained at least one communication device in such a way that, when controlling the ascertained at least one communication device, the communication device communicates with the road user on the basis of the control signals and,
- outputting the generated control signals.

According to a second aspect of the present invention, an example device is provided, which is configured to carry out all steps of the method according to the first aspect.

According to a third aspect of the present invention, an example computer program is provided that includes commands which, when the computer program is executed by the computer, for example, by the device according to the second aspect, prompt the computer to carry out a method according to the first aspect.

According to a fourth aspect of the present invention, an example machine-readable memory medium is provided on which the computer program according to the third aspect is stored.

In accordance with an example embodiment of the present invention, the above object may be achieved by checking and deciding with which communication device communication is to take place with the road user in the surroundings of the motor vehicle. This corresponds to the step of ascertaining at least which communication device of a communication device of the motor vehicle on the motor vehicle side and of a communication device of an infrastructure on the infrastructure side in which the motor vehicle and the road user are located, is to be used in order to communicate with the road user.

This yields, for example, the advantage that a suitable communication device for the communication with the road user may be selected.

One particular communication device is in one case more suitable or in another case less suitable for communicating with the road user as a function of a specific situation.

Thus, this yields, in particular, the technical advantage that an example embodiment of the presented invention is provided for efficiently communicating with a road user located in the surroundings of a motor vehicle driven in at least a semi-automated manner.

According to one specific embodiment of the present invention, it is provided that action signals are received, which represent an instantaneous and/or future action of the motor vehicle, the ascertainment whether a need to communicate exists and/or the ascertainment of at least which communication device is to be used are carried out on the basis of the action signals.

This yields, for example, the technical advantage that the step or steps of ascertaining as explained above may be efficiently carried out.

When "action" is in the singular, it is also to be understood to include the plural and vice versa.

An action according to one specific embodiment is one of the following actions: braking, accelerating, turning, in particular, turning left or turning right relative to a driving direction of the motor vehicle, reversing, stopping, driving off, standing idle, waiting, parking and unparking.

According to one specific embodiment of the present invention, it is provided that when a need to communicate exists, a type of communication is ascertained with the aid of which a communication with the road user is to take place, the ascertainment of at least which communication device is to be used being carried out on the basis of the ascertained type of communication.

This yields, for example, the technical advantage that the corresponding step of ascertaining may be efficiently carried out.

A type of communication according to one specific embodiment is one of the following types of communication: haptic type of communication, visual type of communication, acoustic type of communication, wireless type of communication, in particular, via WLAN and/or mobile communications.

This means, for example, that communication may take place with the road user, for example, visually and/or acoustically and/or via a wireless communication network.

Communicating, within the meaning of the description, includes, for example, conveying a piece of information to the road user.

A wireless communication network may, for example, be used for a communication with the road user. For example, pieces of information may be sent to a mobile device of the road user via a wireless communication network.

Pieces of information may, for example, be sent to a human-machine interface of an additional motor vehicle as a detected road user via a wireless communication network.

Pieces of information, for example, may be sent to a communication device on the infrastructure side via a wireless communication network, for example, to a smart sign, in particular, to a smart traffic sign.

A wireless communication network includes, for example, a WLAN communication network and/or a mobile communication network.

According to one specific embodiment of the present invention, it is provided that environmental data are received, which represent environmental conditions in the surroundings of the motor vehicle, the ascertainment of whether a need to communicate exists and/or the ascertainment of at least which communication device is to be used, being carried out on the basis of the environmental conditions.

This yields, for example, the technical advantage that environmental conditions in the surroundings of the motor vehicle may be efficiently taken into account in the step or steps of ascertaining.

Environmental conditions include, for example, weather and/or lighting conditions and/or road conditions in the surroundings of the motor vehicle.

According to one specific embodiment of the present invention, it is provided that a future behavior of the road user is predicted, in particular, on the basis of the surroundings signals, the ascertainment of whether a need to communicate exists and/or the ascertainment of at least which communication device is to be used being carried out on the basis of the predicted future behavior.

This yields, for example, the technical advantage that the step or steps of ascertaining may be efficiently carried out.

According to one specific embodiment of the present invention, it is provided that an instantaneous behavior of the road user is ascertained, in particular, on the basis of the surroundings signals, the ascertainment of whether a need to communicate exists and/or the ascertainment of at least which communication device is to be used being carried out on the basis of the instantaneous behavior.

According to one further specific embodiment of the present invention, it is provided that upon detection of a road user, a position of the road user relative to the motor vehicle or vice versa is ascertained on the basis of the surroundings signals, the ascertainment of whether a need to communicate exists and/or the ascertainment of at least which communication device is to be used being carried out on the basis of the ascertained position.

This yields, for example, the technical advantage that a position of the road user relative to the motor vehicle or vice versa may be efficiently taken into account in the step or steps of ascertaining. For example, it is provided that a warning is communicated to the road user as a function of the ascertained position. A warning is communicated, for example, if the ascertained position is such that a distance between the motor vehicle and the road user is less than or less than or equal to a predetermined distance threshold value.

Should, for example, a distance between the motor vehicle and the road user according to the ascertained position be greater than or greater than or equal to the predetermined distance threshold value, then it is provided, for example, that a piece of information is communicated to the road user, the information indicating that a motor vehicle driven in at least a semi-automated manner is located in the surroundings of the road user. Here, it may be provided, in particular, that no warning is conveyed to the road user, for example.

The ascertainment of the position includes, in particular, an ascertainment of an instantaneous position and/or a prediction of a future position. Accordingly, a future position is a future distance.

According to one specific embodiment of the present invention, it is provided that upon detection of a road user, a personalized message to the road user is ascertained, the control signals being generated on the basis of the personalized message, so that when controlling the at least one ascertained communication device on the basis of the control signals, the communication device communicates the personalized message to the road user.

This yields, for example, the technical advantage that it is possible to communicate with the road user in an efficiently personalized manner.

According to one specific embodiment of the present invention, it is provided that the personalized message includes an action instruction.

This yields, for example, the technical advantage that an action instruction may be efficiently communicated to the road user.

According to one specific embodiment of the present invention, it is provided that after the generated control signals are output, additional surroundings signals are received, which represent the surroundings of the road user after a control of the ascertained at least one communication device on the basis of the generated control signals, the additional surroundings signals being processed in order to detect a response of the road user to the communication with the aid of the ascertained at least one communication device, in the absence of a response, additional control signals for controlling the ascertained at least one communication device being generated in such a way that when controlling the ascertained at least one communication device on the basis of the additional control signals, the communication device communicates once again with the road user, communicates, in particular, with an increased intensity, the generated additional control signals being output.

This yields, for example, the technical advantage that in the absence of a response of the road user, an efficient response may take place. Should, for example, the road user not have perceived the communication the first time, the road user then receives in an efficient manner another opportunity to perceive the communication.

Communicating with an increased intensity means, for example, that a volume of an acoustic signal, which is output by the ascertained at least one communication device for communicating with the road user, is increased relative to the first communication attempt.

Communicating with an increased intensity means, for example, that an intensity of a visual signal, which is output by the ascertained at least one communication device for communicating with the road user, is increased as compared to the first communication attempt. The same applies to a frequency of the visual signal.

The processing of the additional surroundings signals includes, in particular, a prediction of a behavior of the road user, in order to detect a future response of the road user to the communication with the aid of the ascertained at least one communication device. In this regard, the absence of a response may also include the absence of a future response.

According to one specific embodiment of the present invention, it is provided that the method according to the first aspect is executed or carried out with the aid of the device according to the second aspect.

Technical functionalities of the device according to the second aspect result analogously from corresponding technical functions of the method according to the first aspect and vice versa.

Thus, this means, in particular, that the device features result from corresponding method features and vice versa.

According to one specific embodiment of the present invention, it is provided that the ascertainment of the type of communication is carried out on the basis of the surroundings signals and/or on the basis of the environmental conditions and/or on the basis of the predicted future behavior and/or on the instantaneous behavior of the road user and/or on the basis of the ascertained position, in particular, instantaneous and/or future position, of the road user relative to the motor vehicle or vice versa.

The wording "at least semi-automated driving" encompasses one or multiple of the following cases: assisted driving, semi-automated driving, highly-automated driving, fully automated driving.

Assisted driving means that a driver of the motor vehicle continuously executes either the transverse or longitudinal guidance of the motor vehicle. The respective other driving task (i.e., a control of the longitudinal guidance or transverse guidance of the motor vehicle) is carried out automatically. This means, therefore, that in an assisted driving of the motor vehicle, either the transverse guidance or the longitudinal guidance is controlled automatically.

Semi-automated driving means that in a specific situation (for example: driving on an expressway, driving within a parking facility, passing an object, driving within a lane established by lane markings) and/or for a certain period of time, a longitudinal guidance and a transverse guidance of the motor vehicle is controlled automatically. A driver of the motor vehicle personally need not manually control the longitudinal guidance and transverse guidance of the motor vehicle. However, the driver must continuously monitor the automatic control of the longitudinal guidance and transverse guidance in order to be able to manually intervene when necessary. The driver must be ready to fully take control of the motor vehicle guidance at any time.

Highly automated driving means that for a certain period of time in a specific situation (for example: driving on an expressway, driving within a parking facility, passing an object, driving within a lane established by lane markings), a longitudinal guidance and transverse guidance of the motor vehicle is controlled automatically. A driver of the motor vehicle personally need not manually control the longitudinal guidance and transverse guidance of the motor vehicle. The driver need not continuously monitor the automatic control of the longitudinal guidance and transverse guidance in order to be able to manually intervene when necessary. When necessary, a takeover request is automatically output to the driver to take control of the longitudinal guidance and transverse guidance, in particular, with a sufficient time reserve. The driver must therefore potentially be able to take control of the transverse guidance and longitudinal guidance. Limits of the automatic control of the transverse guidance and longitudinal guidance are identified automatically. In the case of a highly automated driving, it is not possible in every initial situation to automatically bring about a state involving minimal risk.

Fully automated driving means that in a specific situation (for example: driving on an expressway, driving within a parking facility, passing an object, driving within a lane established by lane markings), a longitudinal guidance and transverse guidance of the motor vehicle is controlled automatically. A driver of the motor vehicle personally need not manually control the longitudinal guidance and transverse guidance. The driver need not monitor the automatic control of the longitudinal guidance and transverse guidance in order to be able to manually intervene when necessary. Before terminating the automatic control of the transverse guidance and longitudinal guidance, the driver is requested automatically to take over the driving task (controlling the transverse guidance and longitudinal guidance of the motor vehicle), in particular, with a sufficient time reserve. If the driver does not take over the driving task, a return to a state involving minimal risk is made automatically. Limits of the automatic controlling of the transverse guidance and longitudinal guidance are identified automatically. In all situations, it is possible to return automatically to a system state involving minimal risk.

A communication device within the meaning of the description, i.e., in particular, a communication device on the motor vehicle side and/or a communication device on the infrastructure side, includes, for example, one or multiple of the following elements: visual signal generator, acoustic signal generator, wireless communication interface for communicating via a wireless communication network.

Signal generators of the communication device on the infrastructure side are situated, for example, spatially distributed within the infrastructure.

A visual signal generator of a communication device on the motor vehicle side includes, for example, one or multiple elements of a motor vehicle lighting. An element of a motor vehicle lighting is, for example, one of the following elements: turn signal light, brake light, headlights. An acoustic signal generator is, for example, a signal horn, also referred to as a horn.

A visual signal generator of a communication device on the motor vehicle side includes, for example, a display and/or a screen. In this way, it is possible, for example, to visually communicate pieces of information in an efficient manner. For example, a ticker may be displayed with the aid of the display and/or of the screen. The display and/or the screen is/are therefore controlled, in particular, in such a way that they display a ticker.

According to one specific embodiment of the present invention, the method according to the first aspect is a computer-implemented method.

In one specific embodiment of the present invention, it is provided that the step of controlling the ascertained at least one communication device on the basis of the generated control signals is encompassed by the method.

A road user, for example, is one of the following road users: pedestrian, additional motor vehicle, cyclist.

Exemplary embodiments of the present invention are depicted in the figures and explained in greater detail below.

DETAILED DESCRIPTION OF EXAMPLE EMBODIMENTS

In the following, identical reference numerals may be used for identical features. For the sake of clarity, it may also be provided that all features for individual elements are not always depicted in all of the figures.

Figure 1:
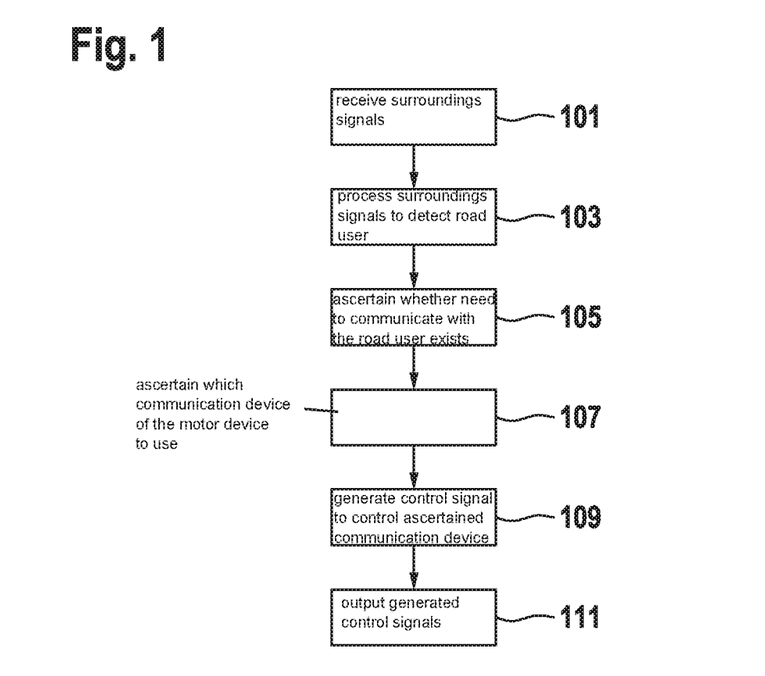
FIG. 1 shows a flow chart of an example method for communicating with a road user located in the surroundings of a motor vehicle driven in at least a semi-automated manner, in accordance with the present invention.

FIG. 1 shows a flow chart of an example method in accordance with the present invention for communicating with a road user located in the surroundings of a motor vehicle driven in at least a semi-automated manner.

The example method includes the following steps:
receiving 101 surroundings signals, which represent the surroundings of a motor vehicle driven in at least a semi-automated manner,
processing 103 the surroundings signals in order to detect a road user in the surroundings of the motor vehicle,
upon detection of a road user, ascertaining 105 whether a need to communicate with the road user exists due to the presence of the motor vehicle,
if a need to communicate with the road user exists, ascertaining 107 at least which communication device of a communication device of the motor vehicle on the motor vehicle side and of a communication device of an infrastructure on the infrastructure side in which the motor vehicle and the road user are located, is to be used in order to communicate with the road user,
generating 109 control signals for controlling the ascertained at least one communication device in such a way that, when controlling the ascertained at least one communication device, the communication device communicates with the road user based on the control signals and,
outputting 111 the generated control signals.

A road user, for example, is one of the following road users: pedestrian, additional motor vehicle, cyclist.

Figure 2:
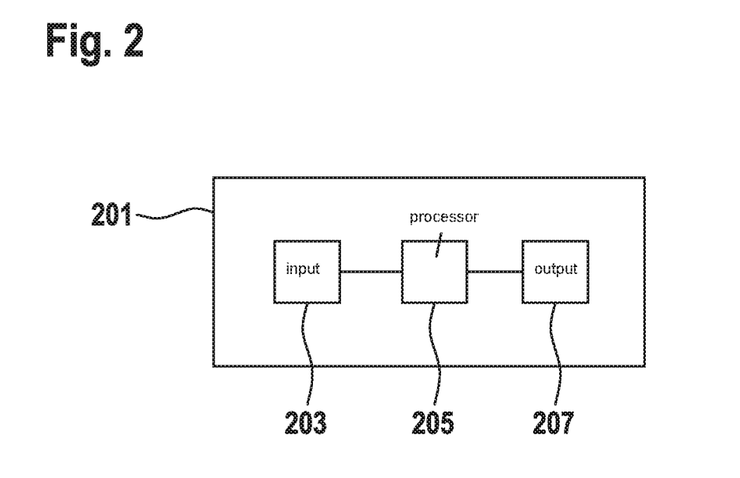
FIG. 2 shows an example device in accordance with the present invention.

FIG. 2 shows an example device 201 in accordance with the present invention.

Device 201 is configured to carry out all steps of the method according to the first aspect.

Device 201 includes an input 203, which is configured to receive the surroundings signals.

Device 201 further includes a processor 205, which is configured to process the surroundings signals. Processor 205 is further configured to execute or carry out the steps of ascertaining according to the method according to the first aspect.

Processor 205 is further configured to generate the control signals.

Device 201 further includes an output 207, which is configured to output the generated control signals.

Input 203 is further configured, for example, to receive the action signals and/or to receive the environmental data.

Input 203 is further configured, for example, to receive the additional surroundings signals. Processor 205 is configured, for example, to process the additional surroundings signals and, in addition, to execute or carry out the corresponding steps according to the corresponding specific embodiment, including the step of receiving the additional surroundings signals. Output 207 is further configured, for example, to output the additional control signals.

Figure 3:
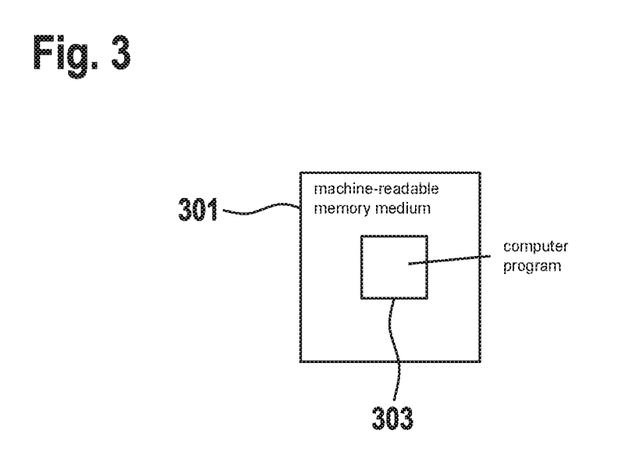
FIG. 3 shows an example machine-readable memory medium in accordance with the present invention.

FIG. 3 shows an example machine-readable memory medium 301 in accordance with the present invention.

A computer program 303 is stored on a machine-readable memory medium 301. Computer program 303 includes commands which, when computer program 303 is executed by a computer, prompt the computer to carry out a method according to the first aspect.

Figure 4:
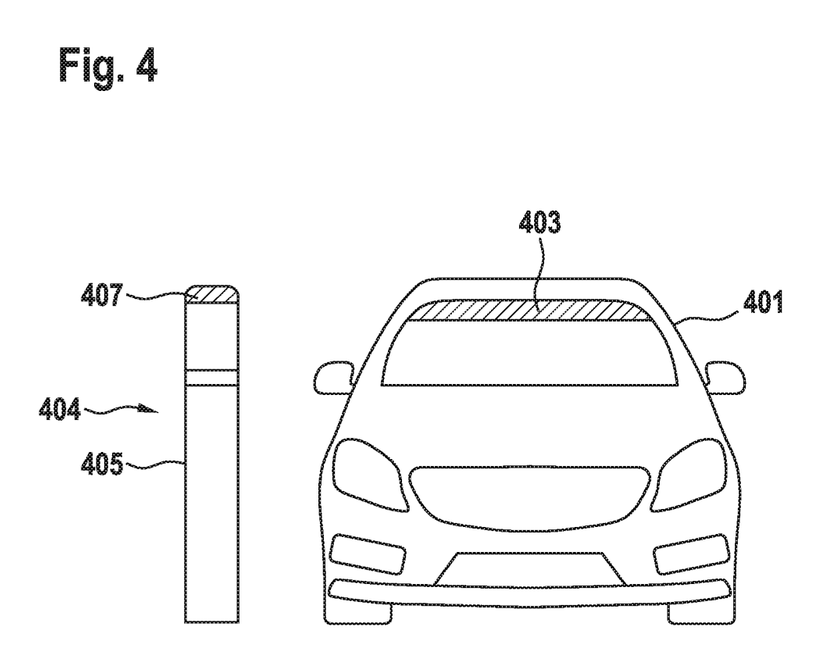
FIG. 4 shows an example communication device on the motor vehicle side and a communication device on the infrastructure side in accordance with the present invention.

FIG. 4 shows an example motor vehicle 401 in accordance with the present invention.

Motor vehicle 401 includes a communication device 403 on the motor vehicle side. Communication device 403 on the motor vehicle side includes, for example, multiple lights, for example, multiple LEDs. The multiple lights are situated, for example, peripherally at motor vehicle 401. Communication device 403 on the motor vehicle side generally includes, for example, one or multiple visual signal generators and/or one or multiple acoustic signal generators.

FIG. 4 further shows a communication device 404 on the infrastructure side including a signal generator 405. Signal generator 405 includes a visual signal generator 407 for outputting a visual light signal.

In one specific embodiment not shown, signal generator 405 includes an acoustic signal generator for outputting an acoustic signal.

According to one specific embodiment, it is possible using visual and/or acoustic signals to efficiently communicate with a road user.

Figure 5:
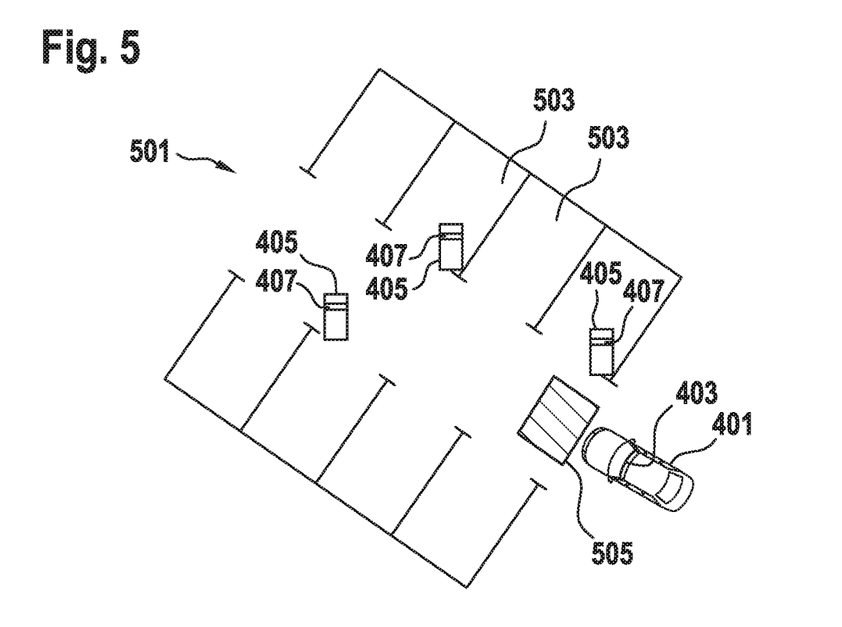
FIG. 5 shows an example parking facility in accordance with the present invention.

FIG. 5 shows an example parking facility 501 in accordance with the present invention.

Parking facility 501 includes multiple parking spaces 503.

Multiple signal generators 405 according to FIG. 4 are situated spatially distributed within parking facility 501.

In addition, motor vehicle 401 drives in at least a semi-automated manner within parking facility 501.

Communication device 403 on the motor vehicle side illuminates an area 505 which is in the driving direction ahead of motor vehicle 401. Thus, motor vehicle 401 signals, for example, that it is presently driven in at least a semi-automated manner.

In addition, visual signal generators 407 of signal generators 405 may visually signal a road user located within parking facility 501 that a motor vehicle driven in at least a semi-automated manner is presently driving within parking facility 501.

An example embodiment of the present invention described herein is now based, in particular, on the fact that it is checked and decided whether a necessity for a communication exists with a road user in the surroundings of the motor vehicle driven in at least a semi-automated manner. If a necessity or need exists, it is initially decided which of the communication devices of the infrastructure and of the motor vehicle is used for the communication. For example, only the communication device on the motor vehicle side or only the communication device on the infrastructure side may be used for the communication with the road user. For example, both the communication device on the motor vehicle side as well as the communication device on the infrastructure side may be used for the communication with the road user.

Corresponding control signals for controlling the ascertained at least one communication device are subsequently generated and output in order to control the corresponding communication devices.

In one specific embodiment of the present invention, it is provided that the step of controlling the ascertained at least one communication device on the basis of the generated control signals is encompassed by the method.

Figure 6:
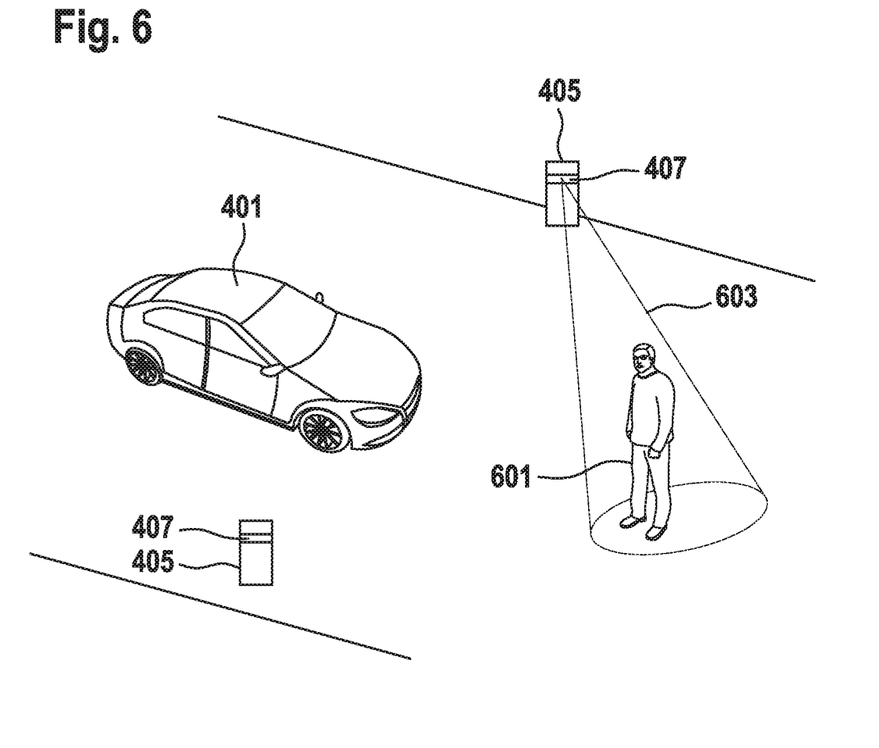
FIG. 6 shows an example visual signal generator during a communication with a road user in accordance with the present invention.

FIG. 6 shows a visual signal generator 407 of a signal generator 405 during a communication with a road user 601 in the surroundings of motor vehicle 401.

The communication includes a spotlighting or illumination of road user 601 with a light cone 603. In this way, it becomes immediately clear to road user 601 that a communication is meant for him/her.

In one specific embodiment of the present invention, it is provided that one or multiple acoustic signals are used for communicating with road user 601. This means, for example, that road user 601 may be addressed in an acoustic manner. An acoustic address may, for example, include an outputting of a personalized sentence. Such a sentence is, for example, the following sentence: "You, pedestrian in the corner."

Figure 7:
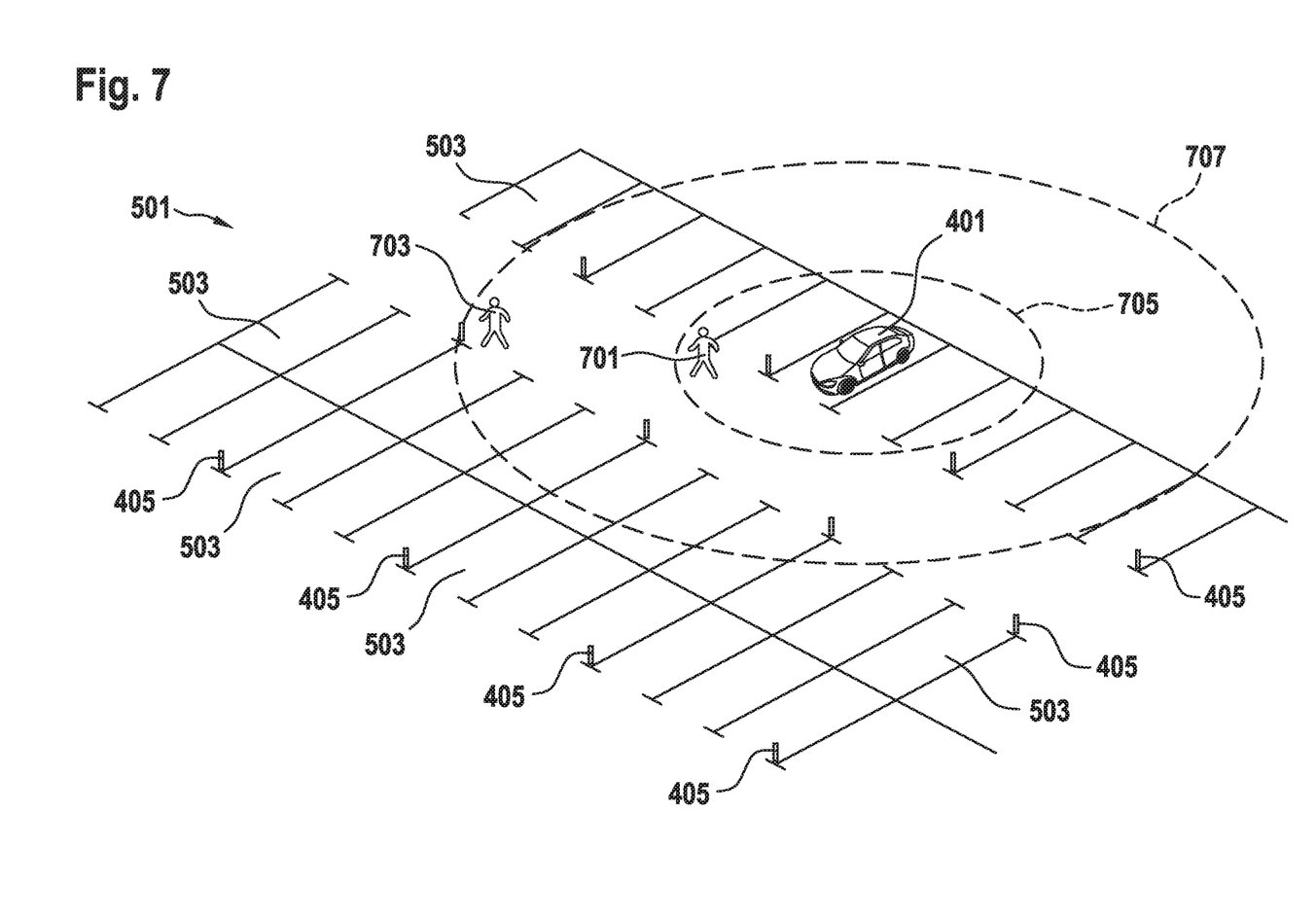
FIG. 7 shows an example distance-dependent communication with a road user in accordance with the present invention.

FIG. 7 shows motor vehicle 401 on a parking space 503 of parking facility 501.

A first road user 701 and a second road user 703 are located in the surroundings of motor vehicle 401.

A first area 705 and a second area 707 are also defined around motor vehicle 401.

First road user 701 is located within first area 705. Second road user 703 is located within second area 707.

An expanse of second area 707 is greater than an expanse of first area 705.

This means that a road user located within first area 705 has a shorter distance to motor vehicle 401 than a road user located within second area 707.

It is provided, for example, that only road users located within second area 707 are signaled that a motor vehicle driven in at least a semi-automated manner is located in their surroundings.

In contrast, road users located in first area 705, for example, are warned of the motor vehicle driven in at least a semi-automated manner.

This means, therefore, that a distance-dependent and/or danger-dependent communication with a road user in the surroundings of a motor vehicle driven in at least a semi-automated manner may be provided.

Figure 8:
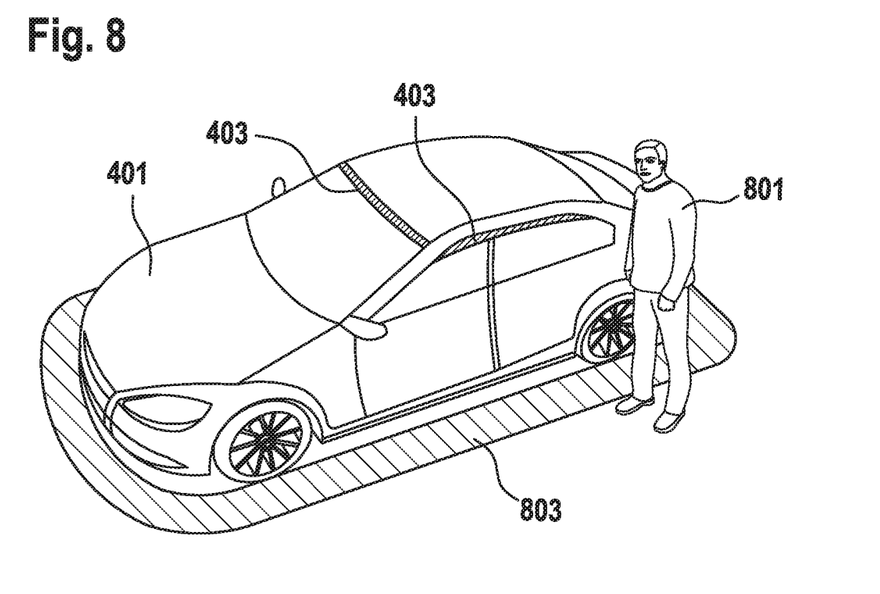
FIG. 8 shows an example communication with a road user in accordance with the present invention.

FIG. 8 shows motor vehicle 401 and a road user 801 in the surroundings of motor vehicle 401.

It is also shown that communication device 403 on the motor vehicle side illuminates an area 803 around motor vehicle 401, in order to visually signal road user 801 that motor vehicle 401 is presently driven in at least a semi-automated manner.

Figure 9:
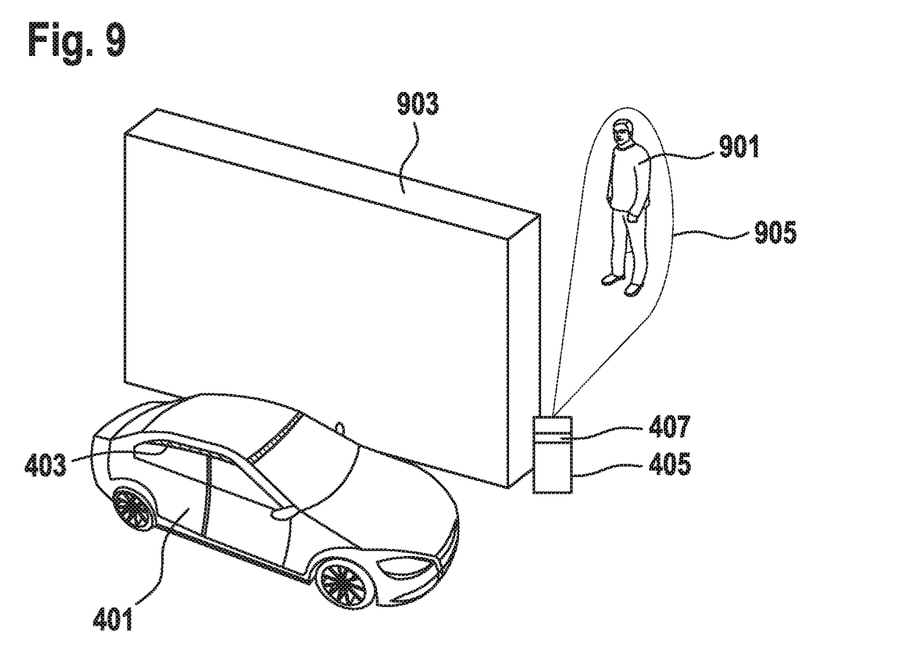
FIG. 9 shows an example additional communication with a road user, in accordance with the present invention.

FIG. 9 shows a situation in which a road user 901 is located behind a wall 903 in relation to motor vehicle 401.

In such a situation, road user 901 is unable to see communication device 403 on the motor vehicle side. This means, therefore, that in this case a communication with road user 901 using communication device 403 on the motor vehicle side is impractical.

Instead, it is provided that communication with road user 901 takes place using visual signal generator 407 of signal generator 405. In this case, it is provided, for example, that road user 901 is illuminated with the aid of a light cone 905, which is generated by visual signal generator 407.

Thus, it is advantageously possible to efficiently warn a road user of a motor vehicle driven in at least a semi-automated manner, even when the road user is unable to see the motor vehicle driven in at least a semi-automated manner.

Figure 10:
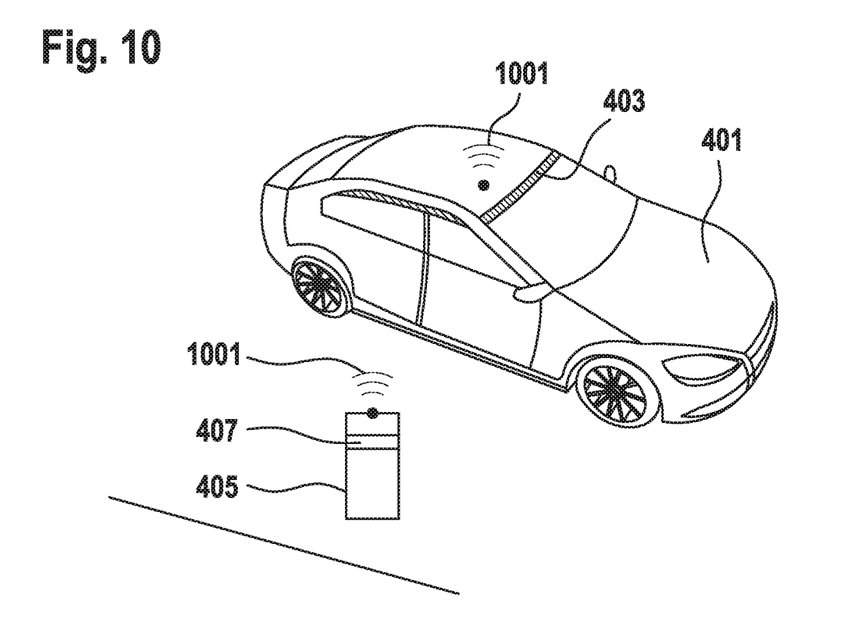
FIG. 10 shows an example communication opportunity with a road user in accordance with the present invention.

FIG. 10 shows motor vehicle 401 and shows signal generator 405.

According to this specific embodiment of the present invention, both communication device 403 of motor vehicle 401 as well as signal generator 405 are each configured to communicate with a road user via a wireless communication network. Such a communication network includes, for example, a WLAN communication network and/or a mobile communication network.

This type of wireless communicating is represented symbolically by graphic elements with reference numeral 1001.

Accordingly, communication device 403 on the motor vehicle side and signal generator 405 each includes a wireless communication interface, for example, a WLAN and/or a mobile communication interface.

Figure 11:
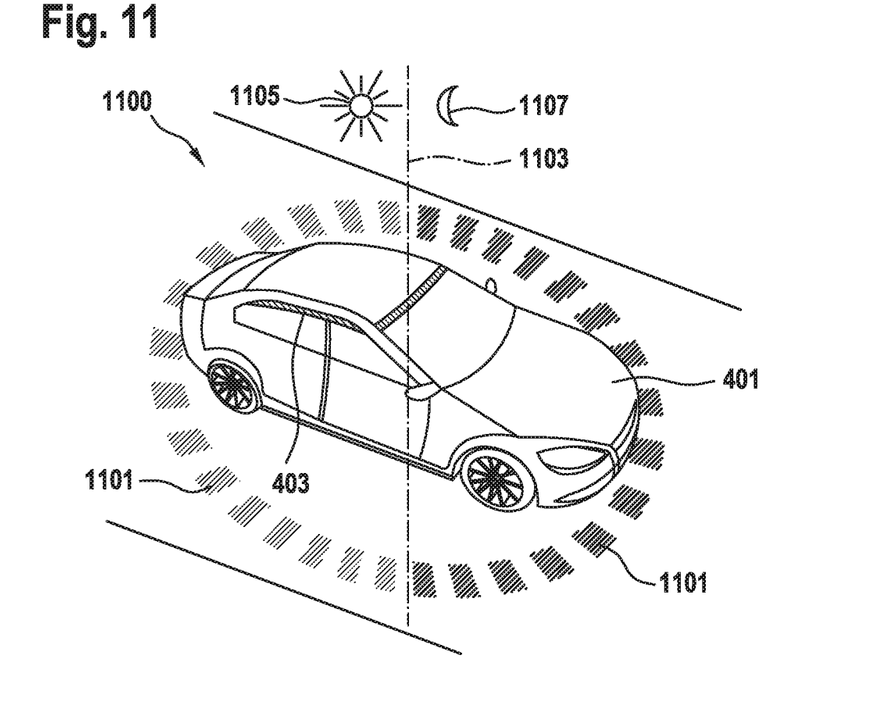
FIG. 11 shows an example motor vehicle according to FIG. 4.

FIG. 11 shows motor vehicle 401.

With the aid of communication device 403 on the motor vehicle side, for example, visual signals 1101 encircling motor vehicle 401 are projected onto a roadway 1100.

Such optical or visual signals are, in particular, of the type that they are always visible during any time of day in any weather.

This means therefore, that such visual signals are also visible at night, for example. For better illustration, a dashed line with reference numeral 1103 is depicted. The area to the left, adjacent to line 1103, shows the situation during the day, which is further symbolized by a sun symbol 1105. The area to the right, adjacent to line 1103, shows the situation at night, which is further symbolized by a moon symbol 1107.

Thus, the present invention provides, in particular, a synchronized (with respect to motor vehicle and infrastructure), situation-dependent (with respect to necessary pieces of information only) and environment-dependent (with respect to weather/lighting conditions) communication, in particular, a visualization, with a road user in the surroundings of a motor vehicle driven in at least a semi-automated manner. The communication includes, for example, an action recommendation for the road user. Such an action recommendation may be visualized, for example.

It is provided, for example, that on the infrastructure side a motor vehicle is assisted in its at least semi-automatedly driven travel. Such assistance includes, for example, a remote control of the motor vehicle. On the infrastructure side, it is provided, for example, that one or multiple actions of the motor vehicle are controlled or ascertained. It is provided, for example, that a target position of the motor vehicle is ascertained.

It is further provided on the infrastructure side, for example, that the surroundings of the motor vehicle are analyzed and, for example, instantaneous as well as possible/probable actions of another road user are analyzed.

It is provided, for example, that communication with the road user takes place on the basis of the action of the motor vehicle and of the analysis of the surroundings and of the action of the other road user. A communication includes informing and/or warning, for example.

For such a communication, a communication device on the motor vehicle side is used, for example. For example, a communication device on the infrastructure side is used for such a communication.

The communication is carried out, for example, as a function of the situation and/or as a function of the environment.

In one specific embodiment, additional action recommendations are communicated.

A communication with a road user is, in particular, carried out only if this is necessary.

It is further provided, for example, that communication takes place with the road user in such a way that the road user is also able to perceive the communication. This means, therefore, that the road user must be able to detect visual and/or acoustic signals, which are used for the communication.

According to one specific embodiment of the present invention, it is further provided that the communication using the communication device on the motor vehicle side and on the infrastructure side is consistent. This corresponds therefore to a synchronization of a communication in each case using the communication device on the motor vehicle side and on the infrastructure side. This means, therefore, that it is not provided that the motor vehicle communicates a first piece of information with the aid of the communication device on the motor vehicle side and that a communication device on the infrastructure side communicates a second piece of information, the two pieces of information being contradictory or dissimilar.

In this case, it is checked and decided, in particular, whether there is a necessity or a need to communicate with the road user. This means, therefore, that there will be an answer to the question of whether a detected road user even needs a piece of information.

For example, a road user requires no information if he/she is en route in a different direction than the motor vehicle driven in at least a semi-automated manner or is located at a distance to the motor vehicle driven in at least a semi-automated manner, which is greater than or greater than or equal to a predetermined distance threshold value.

In a further specific embodiment of the present invention, the pieces of information are adapted, conveyed or communicated. Conveyed in an adapted manner or communicated means, in particular, that pieces of information relevant only to the road user are communicated to the latter. Thus, an answer is given, in particular, to the question of which information is required by the road user.

It may be necessary, for example, that the road user should be informed about a route and/or a parking procedure of the motor vehicle driven in at least a semi-automated manner, since the motor vehicle is in the road user's path.

In one specific embodiment of the present invention, signaling takes place in such a way that the road user is able to perceive that the information is intended for him/her. The road user is illuminated or spotlighted, for example. This means that communication with the road user takes place visually.

For example, the road user may be addressed using audio technology. This means therefore that the road user may be acoustically addressed.

In one specific embodiment of the present invention, it is provided that the communication is carried out as a function of distance and/or as a function of danger. This means therefore that adapted informing or communication takes place depending on the distance or potential danger.

Reference is made here, for example, to FIG. 7, which illustrates such a distance-dependent or danger-dependent communication possibility.

Road users located within second area 707 are in less danger or in no danger at all compared to road users located within first area 705 due to the difference in distance.

In this respect, road users within second area 707 are merely informed and road users located within first area 705 are warned of motor vehicle 401.

Thus, it is checked and decided, in particular, with which communication device, i.e., with a communication device on the motor vehicle side and/or with a communication device on the infrastructure side, communication with the road user is to take place. In this case, it is checked and decided, in particular, with which of these communication devices a piece of information may be best conveyed. It makes no sense, for example, to communicate or convey a piece of information via a communication device on the motor vehicle side if the detected road user is unable to see the motor vehicle.

In this case, it is checked and decided, for example, in which manner the information or warning may best be conveyed. For example, a piece of information may be conveyed via light signals or audio signals.

However, other types of communication may, for example, also be used for the communication. For example, a wireless communication network may be used for a communication with the road user. Pieces of information may, for example, be sent to a mobile device of the road user.

For example, pieces of information may be sent to a human-machine interface of an additional motor vehicle as the detected road user.

It is further analyzed, for example, if necessary, in iterations, whether the detected road user perceived the information or warning. For example, pieces of information or warnings become more intense. Audio signals become louder and/or more urgent, for example. Initially, for example, merely the following acoustic warning or action recommendation may be output: "Stop." Further, if the road user does not respond, the following more urgent warning may be output: "STOPPPPPPP!"

It is further provided, for example, that a visualization is adapted to an instantaneous situation, that a detected road user is also able to perceive this visualization. This means therefore, that among other things, instantaneous lighting conditions and/or instantaneous noise conditions may, for example, be taken into account in the communication with the road user.

In one specific embodiment of the present invention, it is provided that action instructions for the detected road user are ascertained and communicated to the latter. An action instruction may, for example, include the following action instruction: "stop" and "avoid."

In one specific embodiment of the present invention, it is provided that if the detected road user is an additional motor vehicle, the motor vehicle is driven in at least a semi-automated manner in such a way that it implements the action instruction, i.e., for example, it brakes and/or avoids, in particular, stops.

What is claimed is:

1. A method for communicating with a road user located in the surroundings of a motor vehicle driven in at least a semi-automated manner, the method comprising the following steps:
receiving surroundings signals, which represent the surroundings of the motor vehicle driven in at least the semi-automated manner;
processing the surroundings signals to detect the road user in the surroundings of the motor vehicle;
upon detection of the road user, ascertaining whether a need to communicate with the road user exists due to the presence of the motor vehicle;
based on the need to communicate with the road user existing, ascertaining which communication device of: (i) a communication device of the motor vehicle, and (ii) a communication device of an infrastructure in which the motor vehicle and the road user are located, is to be used to communicate with the road user;
generating control signals for controlling the ascertained communication device in such a way that, when controlling the ascertained communication device, the ascertained communication device communicates with the road user based on the control signals; and
outputting the generated control signals, wherein after the generated control signals are output, additional surroundings signals are received, which represent the surroundings of the road user after a control of the ascertained communication device based on the control signals, the additional surroundings signals being processed to detect a response of the road user to the communication using the ascertained communication device, in an absence of the response, additional control signals being generated for controlling the ascertained communication device in such a way that when controlling the ascertained communication device, the ascertained communication device communicates again with the road user with an increased intensity, the generated additional control signals being output.

2. The method as recited in claim 1, wherein action signals are received, which represent an instantaneous and/or future action of the motor vehicle, and wherein the ascertainment of whether the need to communicate exists, and/or the ascertainment of which communication device is to be used, is carried out based on the action signals.

3. The method as recited in claim 1, wherein based on the need to communicate existing, a type of communication is ascertained, using which communication with the road user is to take place, the ascertainment of which communication device is to be used being carried out based on the ascertained type of communication.

4. The method as recited in claim 1, wherein environmental data are received, which represent environmental conditions in the surroundings of the motor vehicle, and wherein the ascertainment of whether the need to communicate exists, and/or the ascertainment of which communication device is to be used, is carried out based on the environmental conditions.

5. The method as recited in claim 1, wherein a future behavior of the road user is predicted, the ascertainment of whether a need to communicate exists, and/or the ascertainment of at least which communication device is to be used, being carried out on the basis of the predicted future behavior.

6. The method as recited in claim 1, wherein upon detection of the road user, a position of the road user relative to the motor vehicle or a position of the motor vehicle relative to the road user is ascertained based on the surroundings signals, and wherein the ascertainment of whether the need to communicate exists, and/or the ascertainment of which communication device is to be used, is carried out based on the ascertained position.

7. The method as recited in claim 1, wherein upon detection of the road user, a personalized message to the road user is ascertained, the control signals being generated based on the personalized message, so that when controlling the ascertained communication device, the communication device communicates the personalized message to the road user based on the control signals.

8. The method as recited in claim 7, wherein the personalized message includes an action instruction.

9. A device configured for communicating with a road user located in the surroundings of a motor vehicle driven in at least a semi-automated manner, the device including a memory storing a computer program, and a processor for executing the computer program, the device configured to:
receive surroundings signals, which represent the surroundings of the motor vehicle driven in at least the semi-automated manner;
process the surroundings signals to detect a road user in the surroundings of the motor vehicle;
upon detection of the road user, ascertain whether a need to communicate with the road user exists due to the presence of the motor vehicle;
based on the need to communicate with the road user existing, ascertain which communication device of: (i) a communication device of the motor vehicle, and (ii) a communication device of an infrastructure in which the motor vehicle and the road user are located, is to be used to communicate with the road user;
generate control signals for controlling the ascertained communication device in such a way that, when controlling the ascertained communication device, the ascertained communication device communicates with the road user based on the control signals; and
output the generated control signals, wherein after the generated control signals are output, additional surroundings signals are received, which represent the surroundings of the road user after a control of the ascertained communication device based on the control signals, the additional surroundings signals being processed to detect a response of the road user to the communication using the ascertained communication device, in an absence of the response, additional control signals being generated for controlling the ascertained communication device in such a way that when controlling the ascertained communication device, the ascertained communication device communicates again with the road user with an increased intensity, the generated additional control signals being output.

10. A non-transitory machine-readable memory medium on which is stored a computer program for communicating with a road user located in the surroundings of a motor vehicle driven in at least a semi-automated manner, the computer program, when executed by a computer, causing the computer to perform:
receiving surroundings signals, which represent the surroundings of a motor vehicle driven in at least a semi-automated manner;
processing the surroundings signals to detect a road user in the surroundings of the motor vehicle;
upon detection of the road user, ascertaining whether a need to communicate with the road user exists due to the presence of the motor vehicle;

based on the need to communicate with the road user existing, ascertaining which communication device of:
(i) a communication device of the motor vehicle, and
(ii) a communication device of an infrastructure in which the motor vehicle and the road user are located, is to be used to communicate with the road user;

generating control signals for controlling the ascertained communication device in such a way that, when controlling the ascertained communication device, the ascertained communication device communicates with the road user based on the control signals; and outputting the generated control signals, wherein after the generated control signals are output, additional surroundings signals are received, which represent the surroundings of the road user after a control of the ascertained communication device based on the control signals, the additional surroundings signals being processed to detect a response of the road user to the communication using the ascertained communication device, in an absence of the response, additional control signals being generated for controlling the ascertained communication device in such a way that when controlling the ascertained communication device, the ascertained communication device communicates again with the road user with an increased intensity, the generated additional control signals being output.

* * * * *